(12) United States Patent
Parker (10) Patent No.: US 12,066,273 B2
(45) Date of Patent: Aug. 20, 2024

(54) AUGMENTED REALITY APPLICATIONS FOR REPORTING ORDNANCE

(71) Applicant: Insights International Holdings, LLC, Franklin, VA (US)

(72) Inventor: Evan Parker, Newsoms, VA (US)

(73) Assignee: Insights International Holdings, LLC, Franklin, VA (US)

( * ) Notice: Subject to any disclaimer, the term of this patent is extended or adjusted under 35 U.S.C. 154(b) by 75 days.

(21) Appl. No.: 17/844,457

(22) Filed: Jun. 20, 2022

(65) Prior Publication Data

US 2023/0204325 A1    Jun. 29, 2023

Related U.S. Application Data

(60) Provisional application No. 63/293,715, filed on Dec. 24, 2021.

(51) Int. Cl.
 G06G 7/80    (2006.01)
 F41G 3/02    (2006.01)
 F41G 3/14    (2006.01)
 F42B 12/36   (2006.01)

(52) U.S. Cl.
 CPC ............. *F41G 3/14* (2013.01); *F41G 3/02* (2013.01); *F42B 12/365* (2013.01)

(58) Field of Classification Search
 CPC . F41G 3/165; F41G 3/142; F41G 3/02; F42B 12/365

USPC .......................................................... 235/411
See application file for complete search history.

(56) References Cited

U.S. PATENT DOCUMENTS

| | | | |
|---|---|---|---|
| 10,065,718 B1 | 9/2018 | Husain | |
| 10,982,932 B1* | 4/2021 | Bilbrey | F41G 3/06 |
| 11,248,891 B2 | 2/2022 | Koontz | |
| 2013/0257656 A1 | 10/2013 | Parker | |
| 2016/0163080 A1 | 6/2016 | Baker | |
| 2017/0146319 A1* | 5/2017 | Lyren | F41G 3/02 |
| 2018/0216915 A1* | 8/2018 | Keller | F41G 3/02 |
| 2020/0263957 A1 | 8/2020 | Northrup | |
| 2021/0063527 A1 | 3/2021 | Nahum | |
| 2023/0095694 A1* | 3/2023 | Parker | F42B 12/34 |
| | | | 102/513 |

* cited by examiner

*Primary Examiner* — Daniel St Cyr
(74) *Attorney, Agent, or Firm* — Fish IP Law, LLP; Tomas A. Prieto (57) ABSTRACT

A system and method of locating a target and presenting the location via augmented reality. The inventive subject matter includes a projectile that can transmit information including location information to other computing devices. These computing devices can then use the location information to determine the relative location of the projectile relative to the computing device and generate a visual representation of the location of the projectile on an augmented reality display such that the location of the target is overlaid over a real-world view through the display.

7 Claims, 4 Drawing Sheets

AUGMENTED REALITY APPLICATIONS FOR REPORTING ORDNANCE

This application claims priority to U.S. provisional application 63/293,715, filed Dec. 24, 2021. U.S. provisional application 63/293,715 and all other extrinsic references contained herein are incorporated by reference in their entirety.

FIELD OF THE INVENTION

The field of the invention is electronic ordnance delivery and information systems.

BACKGROUND

The background description includes information that may be useful in understanding the present invention. It is not an admission that any of the information provided herein is prior art or relevant to the presently claimed invention, or that any publication specifically or implicitly referenced is prior art.

In combat situations, the ability to track a target's whereabouts and movement is critical. In these situations, information can be the difference between success and failure, or even life or death.

Targets historically have been tracked visually, either by eyes on the ground or via aircraft (such as drones). However, the effectiveness of visual tracking has its limits. A target can be lost in bad weather conditions, at night, due to target movement, or if the target enters a structure.

While different types of sensors (e.g., thermal, night vision, etc.) can assist an operator with tracking a target under different environmental conditions, these methods are still limited by line-of-sight operational requirements.

In coordinated efforts, the ability for a squad or other groups of operators to track a target is further limited by the ability of each member to accurately communicate what they are seeing.

Thus, there is still a need for a reliable target-tracking system that provides real-time information to operators in a useful and actionable manner.

SUMMARY OF THE INVENTION

The inventive subject matter provides apparatus, systems and methods in which a projectile embedded in a target is able to generate and transmit signals that enable a computing device to determine the location of the projectile and present a graphical representation of the location projectile relative to a user via an augmented reality display.

In embodiments, the systems and methods of the inventive subject matter can present graphical representations that indicate whether the projectile is stationary or moving. In particular, by changing the color of the indicator, the system can inform a user whether the projectile (and thus, the target carrying the projectile) is moving closer to the user or farther away from the user.

In embodiments, the system can categorize the target that is carrying the projectile, and present the categorization via an augmented reality display. The categorization can be performed by detecting a sensor signal within the target and comparing it against reference sensor signatures.

In embodiments, information about the location of the projectile and other information can be transmitted to a computing device at a command center. This computing device can then display the location of the device and other information on a map for commanders to consider and manage their teams in the field.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The following description includes information that may be useful in understanding the present invention. It is not an admission that any of the information provided herein is prior art or relevant to the presently claimed invention, or that any publication specifically or implicitly referenced is prior art.

Figure 1:
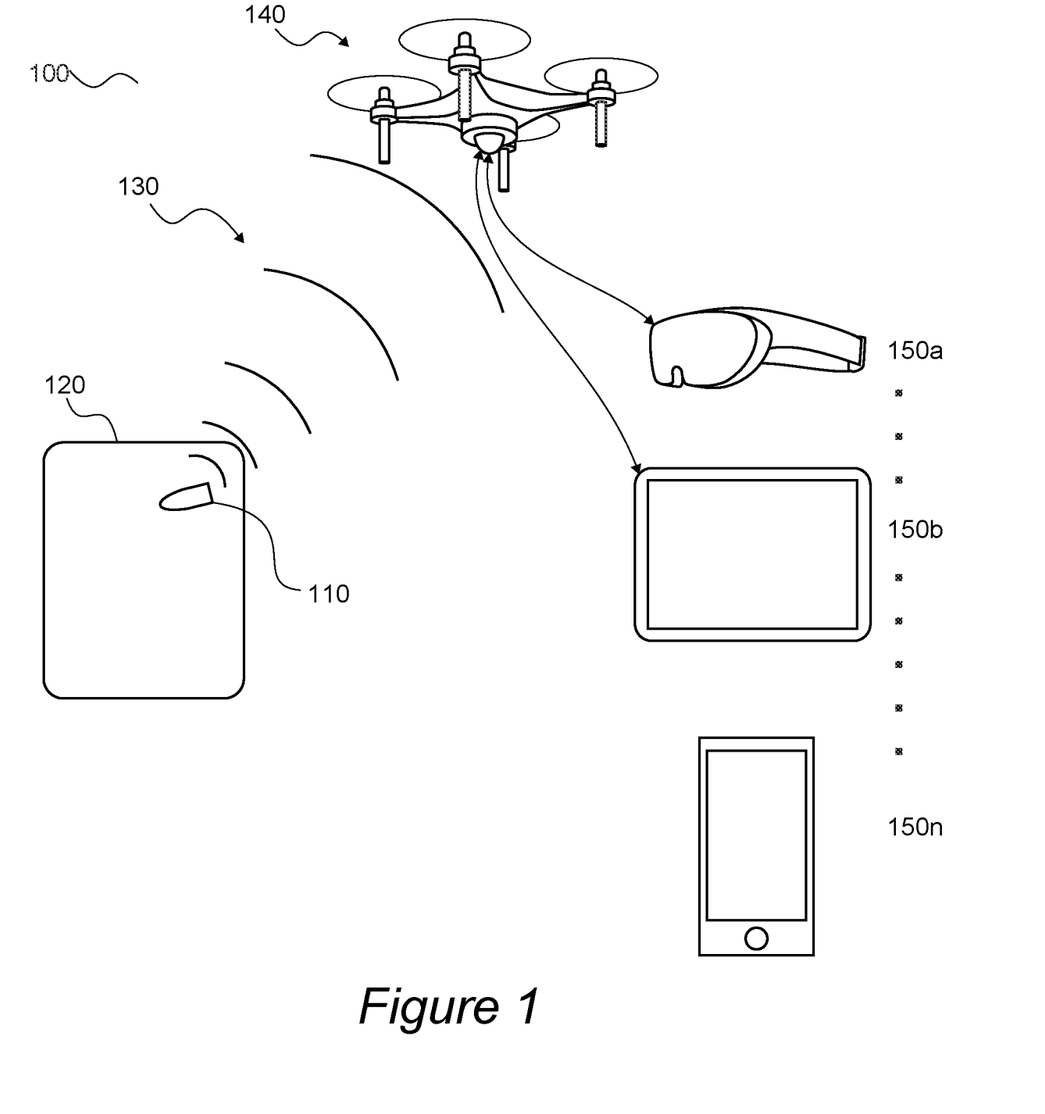
FIG. 1 shows an overview of an augmented reality tracking system according to embodiments of the inventive subject matter.

FIG. 1 shows an overview of an augmented reality tracking system 100 according to embodiments of the inventive subject matter.

As seen in FIG. 1, the system 100 includes a projectile 110 that has been embedded in a target 120. The projectile 110 is shot by a rifle or other weapon into the target 120. The target 120 can be a vehicle, a person, an animal, or other mobile target.

As will be explained further below, the projectile 110 includes an electronics component and a transmitter component that generate a transmission signal 130 that is detected by a computing device 140 that is within range of the transmission signal 130. In embodiments such as the one shown in FIG. 1, the computing device 140 then communicates information regarding the projectile 110 for presentation by devices 150a-150n. While only three devices are shown here, the illustration and labelling of the device 150n is to show that any number of devices 150 could be included within the system 100.

In embodiments such as the one shown in FIG. 1, the computing device 140 can be a relay device that can receive a relatively short-range communication signal 130 and then transmit information via a long-distance communication network to one or more of the devices 150a-150n. In embodiments such as the one shown in FIG. 1, the computing device 140 can be located on a drone or other autonomous vehicle that is loitering or otherwise positioned within communication range of the projectile 110.

In embodiments, the computing device 140 is integral to or unitary with one of the devices 150 if a relay is not necessary or the devices 150 are close enough to the projectile 110 for direct transmission. In a variation of these embodiments, the devices 150 can act as relays to other devices 150.

Figure 2:
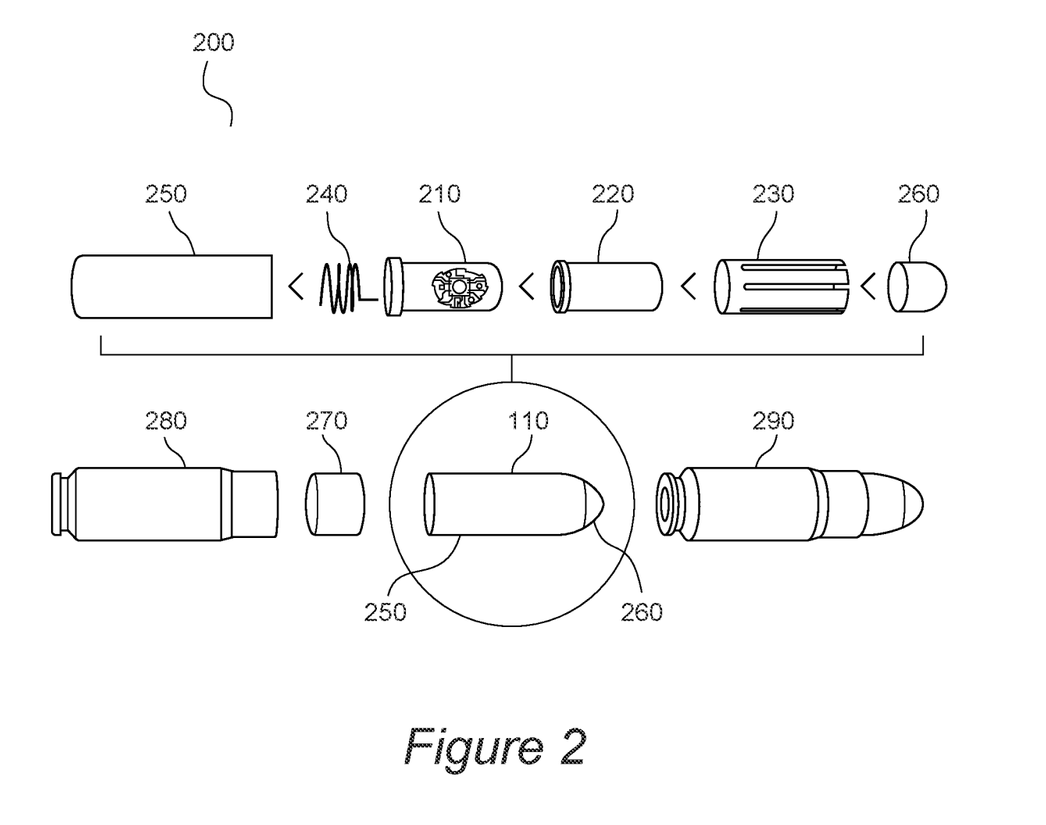
FIG. 2 shows an example of a suitable ordnance deployment system, according to embodiments of the inventive subject matter.

FIG. 2 shows an example of a suitable ordnance deployment system that can be used for the purposes of the inventive subject matter. The system of FIG. 2 is discussed in greater detail in Applicant's U.S. patent application Ser. No. 16/900,226, which is incorporated herein by reference in its entirety.

Projectile 110 includes an electronics component 210 which is enclosed within the housing exoskeleton 220 when the bullet is assembled. In the embodiment shown in FIG. 2, the electronics component 210 includes a transmitter and as such, is coupled to antenna 240 for signal transmission. As assembled, a core 260 is inserted into a first end of the deceleration sleeve 230. The core 260 is made of a material that deforms upon impact and entry into a target body. For example, core 260 can be a lead core or made from another suitable material (e.g., polymer, composite, copper, steel or other hard or soft metals).

The deceleration sleeve 230 encases the housing exoskeleton 220 which contains the electronics component 210, all of which are encased within the outer jacket 250. The outer jacket 250 is then incorporated to finish the assembly of bullet 200. However, it should be noted that in the assembled bullet the tip of core 260 is exposed and not completely enveloped by the outer jacket 250. This is visible in FIG. 2.

As seen in FIG. 2, projectile 110, powder charge 270 and case and primer 280 are then assembled into the finished cartridge 290.

The electronics component 210 can be a tracking device designed to track the location of the device when active (e.g., GPS device or other location determination system). It typically includes a transmitter that can transmit data to a remote computer, such as to communicate the location data and other types of data. The electronics component 210 can also include components such as biomonitors (that can monitor biometric aspects of a target such as heartbeat, temperature, the type of target hit, etc.), microphones, etc. Typically, in addition to having hardware for the specific purpose(s) of the projectile 110 (e.g., sensors, transmitters, etc.) the electronics component 210 will include a processor and physical memory (e.g., RAM, ROM, flash memory, solid-state memory, etc.) that store the programming for the electronics component 210 to execute its functions. The electronics component 210 also includes a battery or other type of portable power supply to power the various parts of the electronics component 210.

The electronics component 210 shown in FIG. 2 is encased in a potting material that is shaped to fit within the housing exoskeleton 220. To encase the electronics component 210, the electronics component 210 is placed within a mold and the potting material then poured into the mold, enveloping the electronics component 210. The potting material then hardens around the electronics component 210 leaving the assembled electronics component 210 with the potting material in the proper shape to fit within the housing exoskeleton 220. Alternatively, the electronics component 210 can be placed within the housing exoskeleton 220 and the potting material poured into the exoskeleton 220 directly such that the potting material encases the electronics component and hardens in the shape of the inside of the exoskeleton 220.

The potting material can be a polymer or other material that can be shaped in this way. The electronics component 210 is seen in FIG. 2 inside the potting material for illustrative purposes. The potting material may be transparent or translucent, such that the electronics component 210 is visible, or it may be opaque such that the electronics component 210 inside is not visible.

The embodiment in FIG. 2 shows an antenna 240 that is external to the electronics component 210. The antenna 240 enables wireless communication to/from the electronics component 210 across various wireless communications technologies (e.g., WiFi, cellular communication along various spectrums (e.g., 4G, 5G, etc.), RF, Bluetooth, NFC, etc.). Thus, the signal 130 can be an RF signal or any other type of wireless communication signal.

It is contemplated that the electronics component 210 could have an internal antenna in addition to/instead of the external antenna 240. Having an internal antenna in addition to the external antenna 240 can provide the electronics component 210 with additional wireless communication modalities and can allow for simultaneous data transmission among these modalities. For example, the external antenna 240 can be a long-range RF antenna while the internal antenna could be a short-range antenna such as a Bluetooth or NFC antenna. Another benefit of having both an internal and external antenna is that, during deployment, the external antenna may become damaged. If this occurs, the internal antenna (which could be of the same or a different wireless technology) serves to provide a backup way for the electronics component 210 to transmit/receive data.

In embodiments of the inventive subject matter, the housing exoskeleton 220 itself can be used as an antenna instead of or in addition to the external antenna 240. Projectiles having this feature are described in Applicant's own U.S. patent application Ser. No. 17/487,990 filed Sep. 28, 2021, titled "Ordnance Delivery System Using a Protective Housing as an Antenna", which is incorporated herein by reference in its entirety.

It is contemplated that the electronics component 210 can communicate with cellular towers, satellites, repeaters, networking devices, mobile devices, and other computer devices. Thus, the electronics component 210 can communicate directly with a controller's computing device or relay the signal indirectly via various types of communication technologies.

In embodiments, the electronics component 210 can communicate with other electronics components 210 of other bullets 200, forming an ad-hoc mesh wireless network. This can be used to relay a more complete representation of a situation to the controller's computing device. This can also be used to relay the signal from one or more bullets 200 back to the controller's computing device. For example, a series of bullets 200 can be fired at various locations near the intended target at distances such that each bullet 200 is within communication range of two other bullets in a chain, such that the series of bullets 200 forms a communication chain that leads from the intended target back within communication range of the operator. In this way, the operator (which could also be the shooter) could track the location of the target with a cellphone or other small portable device 150 that might only have short-range wireless communications capabilities.

In embodiments of the inventive subject matter, the electronics component 210 can include a speaker or other audio transducer that can emit a sound or noise. The processor of electronics component 210 can generate a signal that is output as a sound or noise. In a variation of these embodiments, the audio transducer is configured to emit sounds outside of the human audible spectrum. These signals can then be detected by a microphone of a system that is programmed to listen for the audio signal at the corresponding sound frequency. The sound can be in the form of an audio signature that is recognized by a sensing computing device. This way, the projectile 110 can emit a sound signal to transmit information without being detected by humans.

In embodiments of the inventive subject matter, the projectile 110 does not use a deceleration sleeve.

Figure 3:
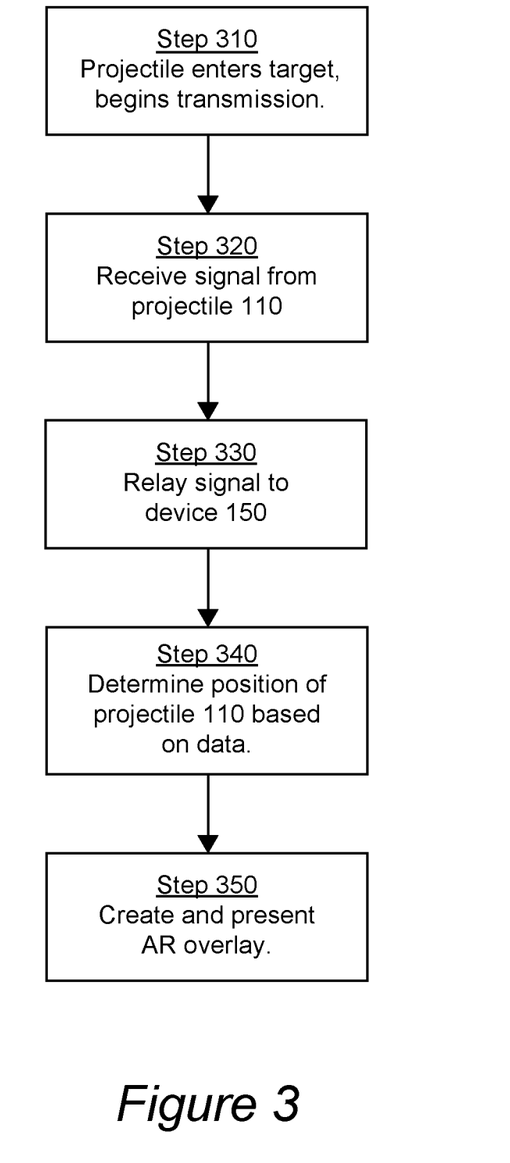
FIG. 3 is a flowchart of processes performed by the system, according to embodiments of the inventive subject matter.

FIG. 3 is a flowchart of the processes performed by the system 100, according to embodiments of the inventive subject matter.

At step 310, the projectile 110 enters target 120 and begins transmission of signal 130 via its transmitter. The signal 130 can include information such as the location of the projectile 110, and other gathered sensor information.

In embodiments where the electronics component 210 includes a speaker, the transmission can be a sound transmission instead of or in addition to an RF or other wireless signal.

At step 320, the computing device 140 receives the signal 130 and relays the information in the signal 130 to one or more devices 150 at step 330.

At step 340, device(s) 150 receive the information from the computing device 140 and, based on the information received, determines a position of the projectile 110 relative to it. This can be based on the position information of the projectile 110 as well as a position and orientation of the device 150 itself, which can be determined by cell signal, gyroscope measurements, accelerometer information, and/or on-board GPS components.

At step 350, the device 150 creates an augmented reality overlay that provides a graphical representation of the projectile over a view of the real-world, based on the determined position of the projectile 110 relative to the device 150.

The graphical representation of the projectile can include an indicator of the projectile itself as well as information associated with the projectile. Examples of information associated with the projectile can include a distance (e.g., from the operator and/or the AR device presenting the graphical representation), global coordinate information, elevation, movement information, temperature information, a status of the target (e.g., living or dead), etc.

Figure 4:
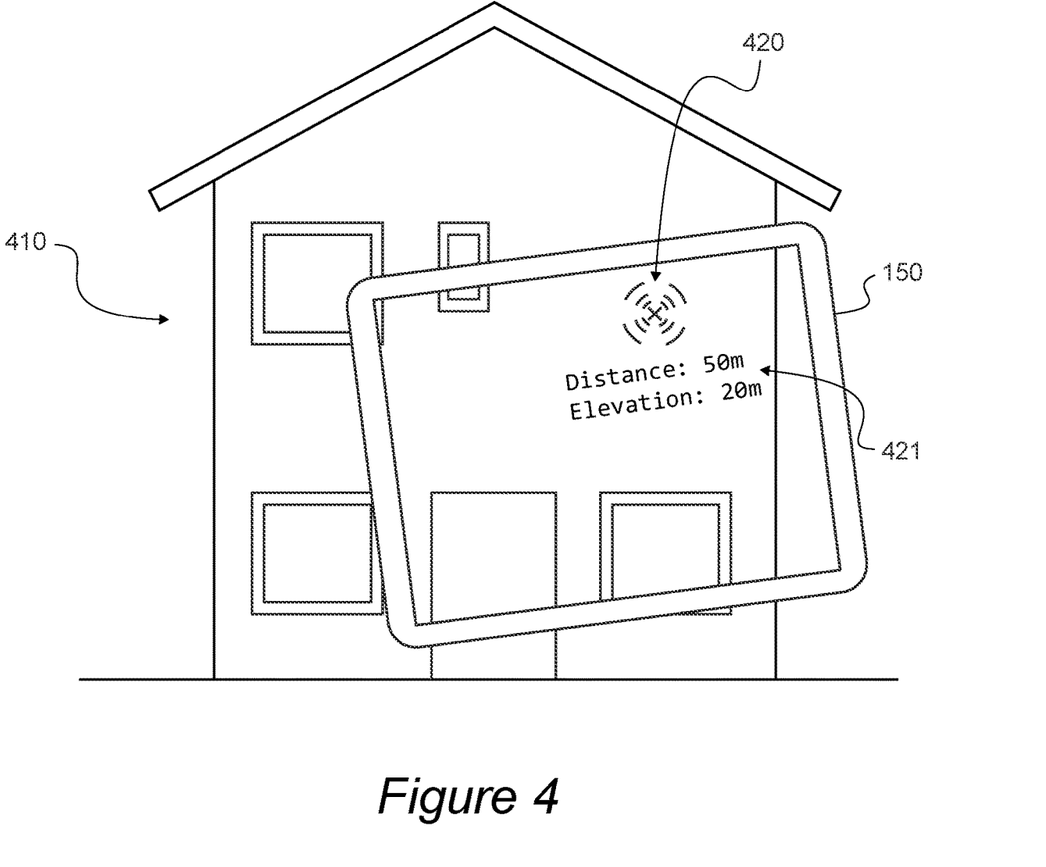
FIG. 4 provides an example of the graphical representation as displayed by a computing device, according to embodiments of the inventive subject matter.

FIG. 4 provides an example of the graphical representation as displayed by a computing device 150 (in this example, a tablet computer).

As seen in FIG. 4, the real-world environment in front of the computing device 150 has a building 410. A camera on computing device 150 provides a view of the real-world environment through the display screen of the computing device 150. Thus, the building 410 is also visible on the screen of the computing device 150.

The graphical representation of the projectile 110 is illustrated as a dot 420 in FIG. 4. This dot 420 is superimposed over the location of the projectile 110 in the real world, thus providing the operator of the device 150 a real-time view of the projectile 110's position within the building 410.

In embodiments such as the one illustrated in FIG. 4, the graphical representation of the projectile 110 can also include information 421 that is presented on the screen of device 150. This information can be information about the projectile 110 itself, information about the target within which the projectile 110 is embedded, environmental information, or any other information that can be gathered by sensors on the projectile 110 and transmitted to the device 150 as discussed herein. For example, based on sensor contained within the projectile 110, the electronics component 210 can categorize the target as a vehicle, a person, etc. This categorization can be performed based on a comparison of the sensor data against reference sensor signatures associated with various possible targets. In this example, the information 421 includes a distance from the projectile 110 to the device 150 and the elevation of the projectile 110 relative to the device 150.

Lateral or vertical movement of the projectile 110 relative to the device 150 is easily seen by the user because the position of the dot 420 will change as the projectile 110 is moved. However, a simple dot may not allow a user to easily discern movement in a z-direction relative to the device 150 (i.e., away from or toward the device 150). Therefore, in embodiments of the inventive subject matter, the graphical representation can also indicate movement of the projectile 110 relative to the device 150.

In some embodiments of the inventive subject matter, the information 421 can include movement information (including direction and velocity) as a textual display.

In other embodiments, the presentation of the dot 420 can be changed to indicate movement toward or away from the device 150. For example, the color of the dot 420 can be changed based on the z-direction movement of the projectile 110 relative to the device 150. By default (i.e., no movement), the dot 420 could be colored yellow. Movement away from the device 150 could be colored green (from a yellow-green indicating slow movement away to bright green indicating rapid movement away), whereas movement toward the device 150 could be represented by a red-colored dot 420 (from a light orange indicated slow movement toward to bright red indicated rapid movement toward).

In a variation of these embodiments, the appearance of the dot 420 can be modified based on a combination of the movement of the dot in a z-direction and a distance of the dot 420 from the device 150. In these embodiments, for example, an entirely different color can be used when the movement of the projectile 110 is toward the device 150 and within a certain range of distance (e.g., to indicate to the operator that contact with the target carrying the projectile 110 may be imminent). Likewise, a different color could be used when the projectile 110 is moving away from the device 150 and outside of a certain distance from the device 150 (e.g., to indicate that the projectile 150 may be moving towards the edge of the detectable/transmittable range).

In embodiments, an internal digital map of a structure is available (e.g., via services such as Google maps or another database containing such a digital map). In these embodiments, the computing device 150 can obtain this map and use the information from the projectile 110 to determine where in the structure the projectile 110 is located (e.g., which room, where in the particular room, etc.) based on a comparison of the real-world location of the projectile 110 from the location information against the corresponding location on the map and present it to the user via the computing device 150. This can be in the form of a map or mini-map presented on the screen of the computing device 150.

In variations of these embodiments, the computing device 150 is programmed to provide contextual information about the projectile 110 relative to the building based on the map information. For example, if the position of the projectile 110 changes such that it comes within a certain distance of a particular feature in the map (e.g., within 5 feet of a door), the computing device 150 can display a contextual message in information 421 (e.g., "CAUTION: Target approaching upstairs bedroom door").

In embodiments of the inventive subject matter, the computing device 150 can also display other information regarding the projectile 110 as well as other information obtained from other sources (other computing devices).

For example, the information transmitted via signal 130 can also include identifying information that identifies the person and/or weapon that fired the projectile 110.

Other information can include information received from a weapon that indicates how much ammunition the weapon has remaining. This can be displayed via the device 150.

In embodiments, the position of other units (other personnel and/or vehicles) can be displayed by computing device 150. In these embodiments, the other units each carry a computing device with position determination capabilities (e.g., GPS) that can transmit this information to one or more of the other units. Thus, each operator can get a more complete picture of where the units are positioned in an environment relative to a target. This decreases the chances of friendly-fire incidents and enables greater coordination and support among units.

It is contemplated that the signal 130, as well as other information discussed herein, can be relayed to a computing device at a command post or command vehicle. The computing device at the command post can then present the location of the projectile 110 on a map (which can be obtained from a provider of digital maps such as Google Maps or other provider) based on the location information from the projectile 110 and the digital map information about the location. If operators at the location are also transmitting their locations to one another, their positions relative to the projectile 110 can also be added to the map.

This way, commanders at the command post have an overview of the situation at the location and can coordinate their teams accordingly.

The projectile 110 can be fired in a variety of ways. In embodiments, the projectile 110 will be fired by a weapon (e.g., a rifle or other firearm) manually operated by a human user. In other embodiments, the projectile 110 can be fired by a weapon mounted on a vehicle. It is contemplated that the vehicle can be manned or unmanned. Examples of contemplated unmanned vehicles can include unmanned aerial vehicles ("UAVs"), unmanned ground vehicles ("UGVs"), and unmanned undersea vehicles ("UUVs"). These unmanned vehicles can have a projectile launcher attached thereto or otherwise integrated into the system where the projectile 110 can be automatically fired at a target or remotely piloted and fired by a remote human operator.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a." "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A system for real-time target tracking using augmented reality, comprising:
    a projectile comprising:
        an electronics component programmed to generate a signal; and
        a transmitter configured to transmit the signal; and
    an augmented reality system comprising a processor and a display, the augmented reality system programmed to:
        receive the signal from the transmitter;
        determine the position of the projectile relative to the augmented reality system based on the received signal; and
        present, via the display and to a user, a graphical representation of the projectile overlaid on an image of a real-world environment based on the determined position of the projectile relative to the augmented reality system;
        wherein at least one of the electronics component and the augmented reality system is programmed to determine that the projectile is moving toward the augmented reality system or away from the augmented reality system, and wherein the augmented reality system is further programmed to:
            present the graphical representation as a first color based on a determination that the projectile is moving toward the augmented reality system; and
            present the graphical representation as a second color based on a determination that the projectile is moving away from the augmented reality system.

2. The system of claim 1, further comprising:
at least one of the electronics component and the augmented reality system programmed to determine whether the projectile is moving; and
the augmented reality system further programmed to:
  present the graphical representation as a first depiction based on a determination that the projectile is stationary; and
  present the graphical representation as a second depiction based on a determination that the projectile is moving.

3. The system of claim 1, further comprising wherein:
the electronics component is programmed to categorize a target within which the projectile is embedded; and
present the graphical representation based on the categorization.

4. The system of claim 1, further comprising:
the augmented reality system programmed to transmit information related to the projectile to a second computing device; and
the second computing device programmed to present a second graphical representation associated with the projectile to a second user.

5. The system of claim 4, further comprising the second computing device programmed to:
determine a position of the projectile relative to the second computing device based on the received information; and
present the second graphical representation based at least in part on the determined relative position.

6. The system of claim 4, wherein the information includes an identification of an operator that fired the projectile.

7. The system of claim 4, wherein the second graphical representation comprises a presentation of the location of the projectile on a digital map.

* * * * *